I. A. SIBLEY, Jr.
BRACKET FOR VEHICLES.
APPLICATION FILED JUNE 11, 1920.
1,376,044.
Patented Apr. 26, 1921.
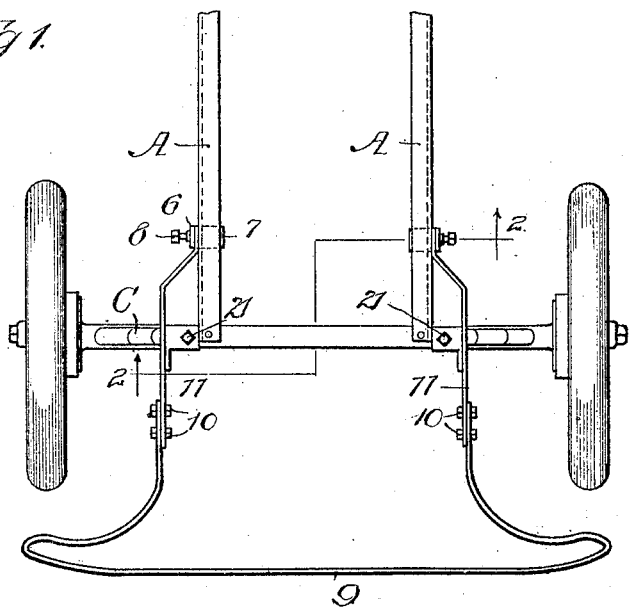
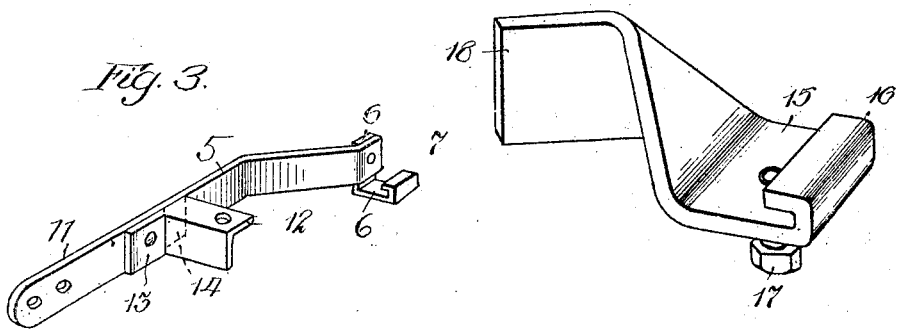
Inventor:
Irving A. Sibley, Jr.
By: Frank D. Thomason Atty.

UNITED STATES PATENT OFFICE.

IRVING A. SIBLEY, JR., OF CHICAGO, ILLINOIS.

BRACKET FOR VEHICLES.

1,376,044.      Specification of Letters Patent.      Patented Apr. 26, 1921.

Application filed June 11, 1920. Serial No. 388,249.

*To all whom it may concern:*

Be it known that I, IRVING A. SIBLEY, Jr., a citizen of the United States, residing at Chicago, in the county of Cook and State of Illinois, have invented certain new and useful Improvements in Brackets for Vehicles, of which the following is a full, clear, and exact description.

My improvements relate to brackets for automobiles, and particularly to means for attaching bumpers or extra tire carriers to the rear end of the well known Ford automobile.

Heretofore when attaching bumpers or extra tire carriers to the rear of a Ford automobile it was considered necessary to bore into the metal parts of the chassis or fasten the ends of the bumpers or tire carriers to the wooden parts of the body where the structure was not strong enough to withstand the strain for any considerable length of time. The object of my invention is to provide simple and cheap brackets for bumpers or extra tire carriers that can be easily and quickly attached and securely held to the sills of the chassis of either a new or an old car without injuring or weakening or disfiguring the same in any manner, substantially as hereinafter fully described and as illustrated in the drawings.

In the drawings:

Figure 1 is a plan view of the rear portion of the chassis of the Ford automobile showing my improvements applied thereto.

Fig. 2 is a cross section taken on dotted line 2, 2, Fig. 1.

Fig. 3 is a perspective view of one of said brackets detached from the chassis.

Fig. 4 is a perspective view of a broken away portion of the front end of a modified construction of said bracket drawn to a larger scale.

The chassis of the Ford car has parallel side-sills A, A, that are made of channel iron, which latter are so disposed that their parallel horizontal flanges, *a*, extend inward. The rear ends of these side-sills are attached to a sort of bow-shaped transverse bolster B whose ends project beyond the sides of the chassis of the car a short distance and is supported upon the springs C.

My improved bracket employs a flat bar, 5, of steel or other suitable material, and the forward end of this bar is placed flat against the outer surface of the vertical side of the sill A so as to extend rearwardly in this position by means of a clip 6. This clip is, preferably, made of a short piece of angle-iron and its vertical flange is placed against the bar 5 and its horizontal flange passes transversely under sill A and extends sufficiently so that its inner edge can be bent back over itself to form a hook 7 that hooks over the inner edge of the lower flange of said sill. When assembled in this manner a set-screw 8 is inserted through a suitable opening in the vertical flange of the clip, and is tapped through the bar, 5, and bites against the outer surface of the vertical web of the side sill. The barrel of this set-screw, between its head and the side of the bracket has an ordinary split washer 19 and a lock-nut 20 mounted thereon, and by properly manipulating the set-screw and the nut 20 the clip will firmly clamp the bar to the sill, and this can be done quickly and without injuring or weakening the sill. I do not desire to be confined to the location of the set-screw, as just described, because it is obvious that it could be tapped from beneath up through the lower flange of the clip, as shown in Fig. 4 of the drawings, and bite against the under surface of the lower flange of the side-sill.

A short distance to the rear of the clip, bar 5 is bent obliquely outward away from the center of the car and then longitudinally straight to the rear a suitable distance back of the rear axle and the body of the car to enable one end of a bumper 9 to be attached by bolts 10, 10, or otherwise to the rear extension 11 thereof.

Where the bar of the bracket passes the adjacent end of the bolster, said bar is provided with a lateral arm 12, that extends over and rests on said end and is secured thereto by a bolt 21. The bolt 21 is one that is used in connection with the body of the car, and when the bracket is being applied this bolt is removed and the body raised to permit the arm to be seated on the end of the bolster, the body is then lowered to its proper position again, and the bolt inserted in place again and at the same time secures the arm from creeping lengthwise off the end of the bolster. When the body is thus restored to its proper position it overhangs and practically conceals from view all of the bracket except that to which the end of the bumper is attached.

This arm 12, is, preferably, made of angle-iron, and the end attached to the bar is split longitudinally at the angle, and one of the divisions so produced is bent at right angles to the flange of which is an extension 13, and the other division is bent at right angles edgewise across the face of the flange just referred to and to the flange of which it forms an extension 14, as shown in dotted lines in Fig. 3 of the drawings, and both of these extensions are welded or otherwise secured to the bar.

The flange forming the vertical portion of this angle-iron arm 12, bears against the rear side of the end of the bolster and assists in resisting the effects of any blow from the rear that may strike the bumper.

These brackets are made rights and lefts and are constructed alike in every essential respect, and when properly secured in place in the manner hereinbefore described, the ends of the bumper 9 can be secured thereto and held rigidly in the position shown in the drawings.

If desired the front ends 15 of the bars 18 can be formed or shaped so as to avoid the use of clips 6, substantially as shown in Fig. 4 of the drawings. In this event the forward ends of said bars are bent horizontally and laterally to an extent corresponding to the width of the lower flanges of the side-sills and so that their end edges can be bent over backward to form a hook 16 which is designed to grip the inner edge of said lower flange. At the outer side of the sill the bar is bent upward and outward at a point a sufficient distance from hook 16 to enable the latter to engage the edge of the flange of the sill and then is twisted to extend obliquely away from the body of the car to the rear. In other respects this modified bracket is constructed similar to the preferred form of bracket, hereinbefore described, and its front end 15 is locked in position by a set-screw 17 tapped up through said front that is adapted to bite into the lower flange of the sill.

What I claim as new is:

1. A bracket for automobiles comprising an elongated metal member, a hook made integral with its forward end and adapted to hook over the edge of the lower flange of the channel-iron side-sill of the chassis of said automobile, and a lateral arm secured to and projecting from said member that is adapted to rest upon the end of the rear transverse bolster of the same.

2. A bracket for automobiles comprising an elongated metal member, a clip made integral with the forward end thereof, having a lateral extension the end edge of which is bent back over the same and adapted to hook over the inner edge of the lower flange of the side-sill of the chassis, a set-screw tapped through said clip and engaging said sill, and a lateral arm secured to said member and adapted to rest upon the adjacent end of the rear transverse bolster of the automobile.

3. A bracket for automobiles comprising a metal bar extending from the sill of the chassis of the automobile to which its forward end is adapted to be secured past the end of the rear transverse bolster of the same, and a lateral angle-iron arm secured at one end to and projecting from said bar and adapted to rest upon the adjacent end of the rear bolster of the chassis of the automobile.

4. A bracket for automobiles comprising a metal bar, an L-shaped clip made integral with the forward end of the same and having the end edge of its horizontal flange bent back over itself, a set-screw tapped through said clip, and a lateral angle-iron arm secured to and projecting from said bar mediate its ends.

5. The combination with the chassis of an automobile having side-sills and a rear transverse bolster, of brackets each comprising a longitudinally elongated member the forward end of which is attached to said sill, which extends to the rear, and between said forward end and bolster is offset laterally and is supported by said bolster, and a bumper the ends of which are secured to the rear ends of said brackets.

In witness whereof, I have hereunto set my hand this 2nd day of June, 1920.

IRVING A. SIBLEY, Jr.

Witnesses:
FRANK D. THOMASON,
VIOLET WARDELL.